United States Patent Office 2,947,740
Patented Aug. 2, 1960

2,947,740

CATALYSIS OF PHOSPHOSULFURIZATION REACTIONS

John A. Brown, Metuchen, N.J., assignor to Esso Research and Engineering Company, a corporation of Delaware No Drawing. Filed May 13, 1958, Ser. No. 734,821

5 Claims. (Cl. 260—139)

This invention is concerned with the phosphosulfurization of hydrocarbons to obtain materials that impart detergency, extreme pressure, oxidation resistance, and other properties to lubricants, fuel oils and similar oleaginous materials. This invention is more particularly concerned with an improved process for treating hydrocarbons with phosphorus pentasulfide. Such processes are improved according to this invention by catalyzing the reaction with almost trace amounts of elemental sulfur. When elemental sulfur is initially added to the reaction mixture, the reaction time is greatly decreased. The addition of the elemental sulfur at any time during the course of the reaction also enhances the appearance and quality of the phosphosulfurized product.

In brief compass, this invention proposes an improvement of a process wherein phosphorus pentasulfide is reacted with a hydrocarbon material having a molecular weight in the range of 500 to 100,000, at a temperature in the range of 350° to 600° F., to obtain a product useful as an additive for oleaginous materials and containing at least 2 weight percent, preferably 3 to 4 weight percent, of combined phosphorus and at least 4 weight percent, preferably 5 or 6 weight percent, of combined sulfur. The improvement of this invention comprises catalyzing the reaction between the phosphorus pentasulfide and hydrocarbon material by adding to the reaction mixture, either initially or at the terminal portion of the reaction, elemental sulfur in a small amount in the range of 0.01 to 1.5 weight percent based on total reaction mass, whereby the reaction time is substantially decreased and the quality of the product is enhanced.

A particularly preferred embodiment of this invention is to use the elemental sulfur catalyst in combination with an oxy acid of phosphorus, especially $HPO_3$ or $H_3PO_4$.

It is known to phosphosulfurize hydrocarbons and petroleum fractions to obtain additive materials useful in lubricants to impart specific properties. In the past, such phosphosulfurization reactions, when practiced on a commercial scale, required 14–15 or more hours at 425° F. to complete, and the quality of the product often varied. This invention proposes the use of elemental sulfur to catalyze and facilitate the phosphosulfurization of hydrocarbons when using phosphorus pentasulfide. It is an important concept of this invention to use only trace or minute amounts of the catalyst. Larger amounts of the catalyst undesirably alter the character of the final product, e.g. impart a black color. By the use of elemental sulfur according to this invention, the phosphosulfurization reaction can be completed on a commercial scale in less than 8 hours, which is a considerably lesser period of time than is obtained with those processes known to the prior art.

While broadly any hydrocarbon material, e.g., paraffin waxes, can be subjected to phosphosulfurization in the manner of this invention, there are two primary feed stocks that are of interest: $C_2$ to $C_{10}$ monoolefin polymers having a molecular weight in the range of 500 to 100,000 and petroleum bright stocks boiling above 700° F. abs. obtained as residues in the distillation of asphalt-free or deasphalted crudes. The sulfur catalysis technique is also useful in the phosphosulfurization of other organic material such as alcohols, e.g. sulfur catalysis aids the reaction of $P_2S_5$ with a mixture of isopropanol-methyl isobutyl carbinol to produce a dialkyl dithiophosphoric acid.

The monoolefin polymers useful in this invention are exemplified by polyethylene, polypropylene and polyisobutylene. It is intended to include, besides homopolymers, copolymers of monoolefins with other olefins such as isoprene, and with other materials such as styrene and similar vinyl compounds. The preferred polymers used have a molecular weight in the range of 200 to 2500, and are freely soluble in heptane at 70° F. Polyisobutylene is particularly preferred.

The petroleum bright stocks useful in this invention are obtained by topping crude oils and extracting or in some cases deasphalting the residues to obtain materials having viscosities above 100 SUS at 210° F., viscosity indices above 80, and initial boiling points above 700° F. Suitable crude oils are Pennsylvania and Mid-Continent. Bright stocks can also be obtained from catalytic cracking cycle stocks. Such bright stocks useful for phosphosulfurization are recognized products of petroleum refining and need no further definition.

It is common practice to refer to phosphorus pentasulfide as $P_2S_5$ although the material is more accurately described as $P_4S_{10}$. This is convenient as generally it is simpler to base calculations on $P_2S_5$. The phosphorus pentasulfide used in this invention should meet the following inspections:

Phosphorus, wt. percent _____ 27.8 to 28.5
Sulfur, wt. percent _____ 71.7 to 72.1.
Impurities, wt. percent _____ Less than 1%.
Pass 20 mesh screen _____ Ca. 85%.
M.P. _____ 275° C. min.

The elemental sulfur catalyst used in this invention can be introduced into the reaction mixture either with the phosphorus pentasulfide or independently thereof. It can be introduced in solid or molten form during either the initial portion of the reaction or the terminal portion of the reaction. There is some advantage to withholding addition of the sulfur catalyst until the terminal portion of the reaction, as its use may not be necessary in all cases. If it appears that a bright and clear sediment-free product will be obtained in a reasonable time, then the sulfur may not necessarily be added; but after a substantial period of time, when it appears that the cooled product still will be opaque and contain insoluble sediment, perhaps because of improper processing conditions such as the presence of excessive free water or too low a temperature, the addition of elemental sulfur will be found, in most cases, to result in a clear and bright product, perhaps somewhat darker upon cooling.

The phosphosulfurization reaction is a straightforward reaction. Usually in the range of 10 to 20 weight percent of the phosphorus sulfide is reacted with the hydrocarbon. Any suitable corrosion resistant reaction vessel can be used, e.g. glass. The reaction temperature is in the range of 350° to 600° F., preferably 425° to 500° F. The reaction times on a commercial scale, i.e. using more than 1,000 lbs. of reactants, are in the range of 2 to 8 hours. The reaction is considered complete when a cooled sample remains bright and clear after two hours of standing. By "bright" is meant that there is no phase separation and the product is free of haze and sediment. Pressure is not too material to the reaction, but is sufficient to prevent vaporization of the reactants and will normally be under two atmospheres. It is preferred to maintain a non-oxidizing atmosphere in the reaction zone. The presence of a substantial amount of free oxygen causes the obtainance of obnoxious precipitate and sediment and severe degradation of color. Preferably the amount of free oxygen in the reaction mixture at any one time should not exceed 0.1 weight percent. The reaction can be carried out under a blanket of nitrogen, carbon monoxide, refinery inert gas, fuel gas, etc. Preferably the inert gas is used as a stripping gas during the reaction. Also preferably the reaction mass is agitated. It is also much preferred to maintain substantially anhydrous conditions during the reaction. The presence of water contributes to sulfur loss and causes the formation of sediment and obnoxious odors. Preferably the free water content of the reaction mixture at any time does not exceed 0.5 weight percent.

The reaction product is useful as an additive without any further treatment, but does have a tendency to evolve hydrogen sulfide. It can be further treated by stripping, extraction, dilution, etc., as desired. The reaction product is particularly useful as an intermediate to prepare more complex mineral lubricating oil additives, as is known in the art. For example, the phosphosulfurized reaction product as obtained in the following examples can be reacted with an equal weight of a high alkalinity barium sulfonate having a molecular weight of 450, at a temperature of 300° F., to obtain a particularly useful automotive engine oil detergent-inhibitor additive. Similarly, the phosphosulfurized hydrocarbon can be reacted with high alkalinity barium nonyl phenates and calcium nonyl phenate sulfides.

EXAMPLE 1

In the following laboratory experiments the hydrocarbon material used was a polybutene formed by the Friedel-Crafts polymerization of isobutylene. It had an average molecular weight of 1100 (Staudinger) and is sold as Indopol H–300 by the Amoco Chemical Company. The Lorol 7 Alcohol used is a mixture of $C_{10}$–$C_{18}$ primary straight chain alcohols obtained from hydrogenated coconut oil. A typical sample contains: $C_{10}$ 2.5%, $C_{12}$ 55.5%, $C_{14}$ 21.0%, $C_{16}$ 10.2%, $C_{18}$ 10.8%. The phosphoric acid was added as an 85% aqueous solution, supplied commercially. It was used as a catalyst and its use normally decreases reaction time by one-half or more as compared to uncatalyzed phosphosulfurized reactions. The phosphorus pentasulfide used was obtained from the Monsanto Chemical Company and had a combined phosphorus content of 28.0 weight percent, a combined sulfur content of 72.0 weight percent, and a melting point of 275° C. The sulfur used to catalyze the reactions in runs 2, 3 and 5 according to this invention was 99+ percent pure commercial flowers of sulfur.

The polybutene and the $P_2S_5$ were reacted at a temperature of 425° F. under a nitrogen blanket in a three-neck glass laboratory flask, fitted with a glass stirrer, heating mantle, thermometer, thermoregulator, and nitrogen bubbler. All the ingredients were charged to the reaction flask before heating was commenced. After the time indicated to heat the material to reaction temperature, 425 F., the number of hours to complete the reaction was noted by observing the time required to produce a bright and clear sample. To determined this time, samples were periodically drawn at intervals and allowed to cool. The products in all the runs were substantially indistinguishable from one another, except that when sulfur was used, the products were somewhat darker, the degree being proportional to the amount of sulfur used.

Table 1

| Run | Materials | | Hours to Heat to 425° F. | Hours @ 425° F. to Complete |
|---|---|---|---|---|
| 1 | Polybutene | 425 grams | 3–6 Typical | 5–8 Typical |
|   | $P_2S_5$ (15%) | 63.8 grams | | |
|   | $H_3PO_4$ | 5 drops | | |
|   | Lorol 7 Alcohol | 1 drop | | |
| 2 | Polybutene | 416 grams | 4 | 0.1 |
|   | $P_2S_5$ (15%) | 62.5 grams | | |
|   | $H_3PO_4$ | 5 drops | | |
|   | Lorol 7 | 1 drop | | |
|   | Sulfur | 6.0 grams | | |
| 3 | Polybutene | 433 grams | 6 | 0.5 |
|   | $P_2S_5$ (15%) | 65.8 grams | | |
|   | $H_3PO_4$ | 5 drops | | |
|   | Lorol 7 Alcohol | 1 drop | | |
|   | Sulfur | 2 grams | | |
| 4 | Polybutene | 673 grams | 4 | 1.5 |
|   | $P_2S_5$ (15%) | 100 grams | | |
|   | $H_3PO_4$ | 5 drops | | |
|   | Lorol Alcohol | 1 drop | | |
|   | Sulfur | 2 grams | | |

This example shows that the addition of trace amounts of sulfur according to this invention surprisingly and materially reduces the reaction time of the phosphosulfurization reaction, even in the presence of other catalysts.

EXAMPLE 2

The materials used were the same as those used in Example 1. 10,000 pounds of polybutene were reacted with 1500 pounds of the $P_2S_5$ in a 2,000 gallon glass lined Pfaudler kettle with associated heating and feed lines. The reaction temperature was 425–450° F., the vessel was blanketed with nitrogen, and the reaction mixture was agitated. In the absence of any catalyst, the product after ten hours of heating at 425° F. still remained opaque upon cooling and contained insoluble sediment. No changes occurred in this product after standing for several hours. After ten hours of heating, 0.2 weight percent of the elemental sulfur were added to a sample at 425° F. The product upon addition of the sulfur cleared in a few minutes and remained bright on cooling, although it was somewhat darker than before addition of the sulfur.

During another run in the same equipment and under the same conditions, 0.1 weight percent sulfur was added to the kettle and materially improved the reaction. Similarly, 0.2 weight percent of sulfur was added during another run and decreased the time required for the reaction and improved the brightness of the final product.

This example shows that the addition of sulfur according to this invention materially contributes to an improved product not otherwise obtainable by conventional methods.

Having described this invention, what is sought to be protected by Letters Patent is succinctly set forth in the following claims.

What is claimed is:

1. In a process wherein phosphorus pentasulfide is reacted with a hydrocarbon material selected from the group consisting of $C_2$–$C_{10}$ monoolefin polymers having a molecular weight in the range of 500–100,000 and petroleum bright stocks having viscosities above 100 SUS at 210° F., viscosity indices above 80 and initial boiling points above 700 F. abs. at a temperature in the range of 350° to 600° F. to obtain a product useful as a lubricant additive containing above 2 weight percent of combined phosphorus and above 4 weight percent of combined sulfur; the improvement which comprises catalyzing the reaction between said phosphorus pentasulfide and hydrocarbon material by adding to the reaction mixture elemental sulfur in an amount in the range of 0.01 to 1.5 weight percent and in the range of 0.01 to 0.1 weight percent of an oxygen acid of phosphorus, consisting of hydrogen phosphorus and oxygen, whereby the quality of the product is enhanced.

2. The process of claim 1 wherein said reaction mixture is substantially anhydrous, the reaction temperature is in the range of 425° to 500° F., the free oxygen content therein is less than 0.1 weight percent and the gross water content at all times is less than 0.5 weight percent.

3. The process of claim 1 wherein the elemental sulfur is initially added to said reaction mixture and the reaction time necessary to obtain a clear and bright product is less than 8 hours.

4. The process of claim 1 wherein said elemental sulfur is added after said phosphorus pentasulfide and said hydrocarbon material have been reacted for an appreciable period of time.

5. The process of claim 1 wherein said hydrocarbon material is a polyisobutylene having a molecular weight in the range of 500 to 2500, wherein the amount of phosphorus pentasulfide used is in the range of 10 to 20 weight percent, based on said polyisobutylene, and wherein the product contains in the range of 3 to 4 weight percent phosphorus and in the range of 5 to 6 weight percent combined sulfur, and is clear and free from sediment.

References Cited in the file of this patent

UNITED STATES PATENTS

| | | |
|---|---|---|
| 2,424,402 | Loane et al. | July 22, 1947 |
| 2,606,182 | Musselman | Aug. 5, 1952 |
| 2,677,620 | Lemmon et al. | May 4, 1957 |
| 2,851,416 | Sabol et al. | Sept. 9, 1958 |